(12) United States Patent
Ikegami et al.

(10) Patent No.: US 8,560,093 B2
(45) Date of Patent: Oct. 15, 2013

(54) PROGRAM EDITING DEVICE FOR PROGRAMMABLE CONTROLLER

(75) Inventors: Kenichi Ikegami, Inazawa (JP); Tsutomu Araki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 1121 days.

(21) Appl. No.: 12/505,789

(22) Filed: Jul. 20, 2009

(65) Prior Publication Data

US 2010/0023139 A1    Jan. 28, 2010

(30) Foreign Application Priority Data

Jul. 28, 2008    (JP) ................. 2008-194090

(51) Int. Cl.
*G05B 9/02* (2006.01)
*G05B 11/01* (2006.01)
*G05B 15/00* (2006.01)
*G05B 19/42* (2006.01)
*G06F 17/30* (2006.01)

(52) U.S. Cl.
USPC ............ 700/79; 700/17; 700/18; 700/23; 700/83; 700/86; 700/87; 726/28

(58) Field of Classification Search
USPC ............ 700/18, 23, 79, 83, 86, 87; 726/28
See application file for complete search history.

(56) References Cited

U.S. PATENT DOCUMENTS

| 6,850,915 B1 * | 2/2005 | Wiehler | 705/57 |
|---|---|---|---|
| 7,245,907 B1 | 7/2007 | Numata | |
| 2004/0260408 A1 * | 12/2004 | Scott et al. | 700/20 |
| 2005/0228517 A1 * | 10/2005 | Tomita | 700/87 |
| 2007/0050432 A1 | 3/2007 | Yoshizawa | |
| 2007/0079370 A1 | 4/2007 | Jinkawa et al. | |
| 2008/0010042 A1 | 1/2008 | Kanbe | |
| 2009/0005884 A1 * | 1/2009 | Ikegami et al. | 700/18 |
| 2009/0287321 A1 * | 11/2009 | Lucas et al. | 700/79 |

FOREIGN PATENT DOCUMENTS

| JP | 2005-227873 A | 8/2005 |
|---|---|---|
| JP | 2007-11713 | 1/2007 |
| JP | 2008-4026 A | 1/2008 |

OTHER PUBLICATIONS

Office Action issued Aug. 9, 2012 in Japanese Patent Application No. 2008-194090 (with English-language translation).

* cited by examiner

*Primary Examiner* — Mohammad Ali
*Assistant Examiner* — Jennifer L Norton
(74) *Attorney, Agent, or Firm* — Oblon, Spivak, McClelland, Maier & Neustadt, L.L.P.

(57) ABSTRACT

A common library stores therein user function blocks and ready-made protected function blocks. By being manipulated by the user, an editing device links some of function programs stored in the function blocks in the library to form a control program which controls the exchange of signals between I/O modules and external devices. A control section in the terminal device allows the alteration of the function programs included in the user function blocks, but inhibits the alteration of the function programs included in the protected function blocks.

10 Claims, 5 Drawing Sheets

PROGRAM EDITING DEVICE FOR PROGRAMMABLE CONTROLLER

INCORPORATION BY REFERENCE

This application is based on and claims priority under 35 U.S.C. 119 with respect to Japanese patent application No. 2008-194090 filed on Jul. 28, 2008, the entire content of which is incorporated herein by reference.

BACKGROUND OF THE INVENTION

1. Field of the Invention

The present invention relates to a program editing device for a programmable controller for editing control programs executable in the programmable controller.

2. Discussion of the Related Art

For example, JP2007-11713 A discloses prior art relating to a programmable controller (PLC: also called "programmable logic controller") in which a CPU module controls the exchange of signals between I/O modules and external safety devices. In the prior art, a plurality of function blocks corresponding to respective I/O modules are arranged on a display, and a user uses a computer system to connect these function blocks with connecting elements, coupling elements or the like so as to prepare and edit a control program which controls the exchange of signals between the I/O modules and the external devices.

The programmable controller in the prior art employs a so-called "image programming" method, in which a control program can be prepared only by connecting a plurality of function blocks arranged on the display, so that any user unskilled in preparing programs is enabled to prepare control programs.

On the other hand, for users skilled in preparing control programs, there has been a need to make the best use of their abilities in preparing sophisticated control programs which are suitable to external safety devices connected to respective I/O modules or other external devices than the external safety devices. For this purpose, there has been existed a programmable controller employing a program preparation method (free programming method) which provides a programming user with a wide range of freedom for preparation of control programs.

The latter mentioned prior art is designed to use ladder circuits and function blocks in preparing circuit applications and makes it possible to carry out the programming highest in freedom though the users are required to have acquired engineering skill relating to programming.

In the programmable controllers of the latter mentioned type, it may the case that there are used function blocks (user function blocks or unprotected function blocks) including function programs which have been prepared by the programming user. In this case, the control program so prepared may become a program in which maker function blocks (protected function blocks) having been supplied by the manufacturer of the programmable controller are mixed together with the aforementioned user function blocks.

In programmable controllers, it has been a practice to store a plurality of function blocks in a library which is provided in a CPU module or a computer system connected to the CPU module. Therefore, it is often the case that the library has been locked to make it unable to alter the function programs in the maker function blocks. Accordingly, in the aforementioned programmable controller wherein the program preparation can be done in the aforementioned "free programming" method, the library so locked brings about the situation that it is also impossible to alter the stored user function blocks.

To obviate this drawback, there has been known a method in which a plurality of libraries are provided to separate one storing maker function blocks only from another storing user function blocks only. However, the use of the plurality of libraries often results in an increase of the memory capacity and hence, makes a cause of increasing the manufacturing cost for the programmable controller.

SUMMARY OF THE INVENTION

It is therefore an object of the present invention to provide a program editing device for a programmable controller, capable of storing in a common library protected function blocks inhibited from alteration and unprotected function blocks allowed to alter.

Briefly, according to the present invention, there is provided an improved program editing device for editing control programs which are executable in a programmable controller, and the program editing device comprises a library storing protected function blocks and unprotected function blocks therein; and editing means for forming a control program by linking some of function programs included in the protected function blocks or the unprotected function blocks in the library and for allowing the alteration of the function programs included in the unprotected function blocks in the library but for inhibiting the alteration of the function programs included in the protected function blocks in the library.

With this construction, because the editing means allows the alteration of the function programs included in the unprotected function blocks in the library but inhibits the alteration of the function programs included in the protected function blocks, it becomes possible to store in the common library the protected function blocks inhibited from alteration by the user and the unprotected function blocks allowed to be altered by the user. Thus, it becomes possible to use the function blocks of the both kinds in preparing control programs, so that a degree of freedom can be enhanced in preparing control programs. Further, since no other library but one library only is required, an increase in memory capacity can be prevented, so that the program editing device for the programmable controller can be reduced in cost.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Hereafter, a program editing device for a programmable controller in a first embodiment according to the present invention will be described with reference to FIGS. 1 to 3. In FIG. 3, a protected function block is shown as "Protected FB". Although the program editing device for a programmable controller in the first embodiment employs a control program preparation method so-called "free programming", the present invention is not limited to the control program preparation method of this type.

Figure 1:
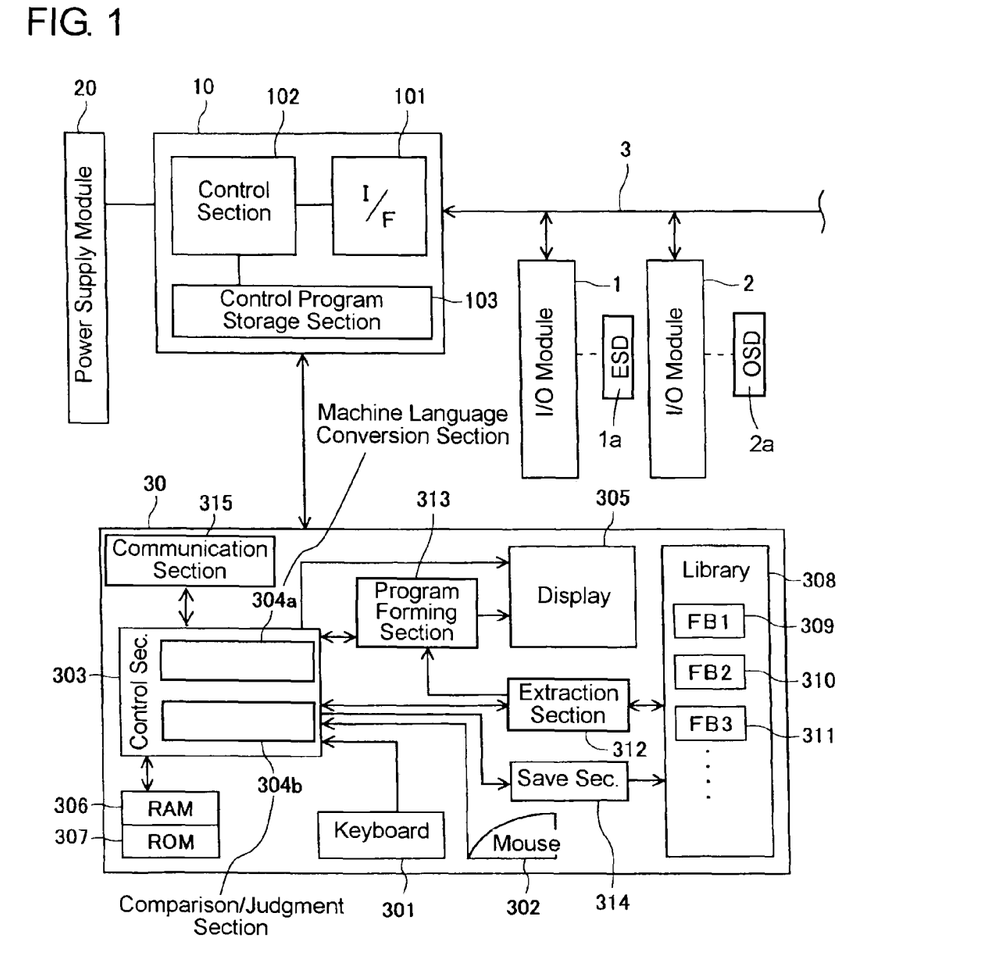
FIG. 1 is an entire block diagram of a programmable controller with a terminal device as program editing device connected thereto in a first embodiment according to the present invention.
Figure 2A:
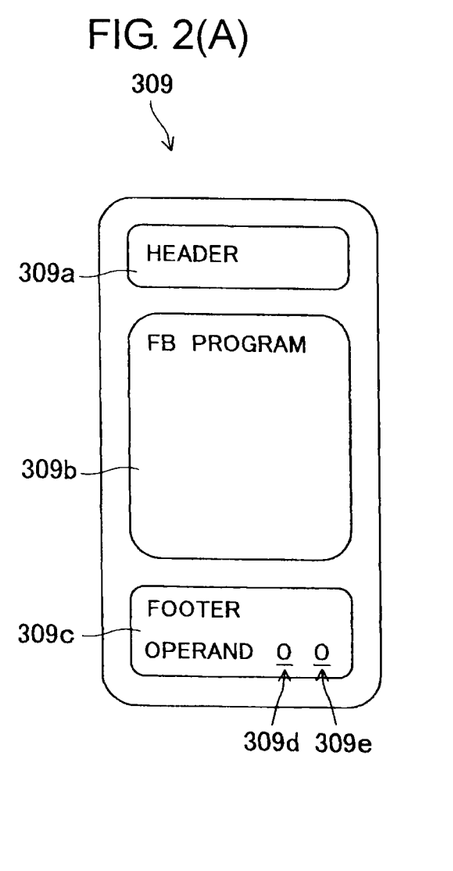
FIGS. 2(A) and 2(B) are explanatory views showing the program structures of protected and unprotected function blocks shown in FIG. 1.

As shown in FIG. 1, the programmable controller in the present embodiment is provided with an I/O module 1 (corresponding to a safety I/O module in the claimed invention) connected to a plurality of external safety devices (ESD) indicated collectively as "1a", an I/O module 2 (corresponding to an ordinary-use I/O module in the claimed invention) connected to other external devices (OED) indicated collectively as "2a" than the external safety devices 1a, a CPU module 10 connected to the I/O modules 1 and 2 through a bus 3, a power supply module 20 connected to the CPU module 10 for supplying electric power to the CPU module 10, and a terminal device 30 (corresponding to a program editing device in the claimed invention) connected to the CPU module 10 and manipulatable by the user (i.e., programming user).

The external safety devices 1a connected to the I/O module 1 include emergency avoidance devices such as, for example, emergency stop buttons, emergency detection devices like light curtains or the like, emergency stop devices for equipments, emergency warning devices and the like which are installed in a factory though they are not limited to these devices. On the other hand, the other external devices 2a connected to the I/O module 2 than the external safety devices 1a include product inspection devices and equipment facilities which are also installed in the factory. Each of the I/O modules 1 and 2 is provided with a CPU, a RAM and a ROM and is configured to meet the specifications of the external devices connected thereto.

The CPU module 10 is provided with a control section 102 connected to the I/O modules 1 and 2 through an interface 101 and a control program storage section 103 connected to the control section 102. In addition thereto, the CPU module 10 may be provided with an external memory device such as hard disc or the like.

The control section 102 is constituted by a CPU, a ROM and a RAM (all not shown) and is able to exchange signals between itself and the I/O modules 1, 2 through the interface 101. The control program storage section 103 is constituted by a rewritable memory and, as mentioned later, stores control programs in a machine language prepared by the terminal device 30.

The terminal device 30 is constituted by a conventional computer system and is provided with a keyboard 301 and a mouse 302 which enable the user to manipulate for data input, a control section 303 (corresponding to editing means in the claimed invention) connected to the keyboard 301 and the mouse 302, and a display 305 (corresponding to a program display section in the claimed invention) connected to the control section 303.

The control section 303 is provided with a microprocessor (not shown) and includes a machine language conversion section 304a and a comparison/judgment section 304b. Further, the control section 303 has a RAM 306 and a ROM 307 connected thereto and controls, in addition to the display 305, an extraction section 312, a program forming section 313, a save section 314 and a communication section 315 which will be referred to later. As described later, the display 305 displays a control program formed by the program forming section 313, on a block-by-block basis of a user function block or a protected function block.

A library 308 (corresponding to the library in the claimed invention) as storage memory area is formed in the terminal device 30. In the single or common library 308, there have been stored a plurality of function blocks 309-311 (including a first function block 309, a second function block 310 and a third function block 311) and the like which are necessary to form control programs.

Each of the function blocks 309-311 includes a function program, and each function program represents in the form of a program a ladder circuit which calculates an output signal to be outputted in response to an input signal from an external safety device 1a or an external device 2a other than the external safety device 1a, and is programmed to execute an operation processing which is appropriate for the specifications of an external device (comprehensively called to designate either one of an external safety device 1a and an external device 2a other than the external safety device 1a) related thereto.

User function blocks (corresponding to the unprotected function blocks in the claimed invention) which can be prepared by the user and protected function blocks (corresponding to the protected function blocks in the claimed invention) which have been made in advance (i.e., ready made) by a manufacturer of the programmable controller are mixed together as the function blocks 309-311 stored in the library 308. The function programs included in the protected function blocks are function blocks inherent to the I/O module 1 connected to the external safety devices 1a, while the function programs included in the user function blocks are function blocks relating to the I/O module 2 connected to the other external devices 2a than the external safety devices 1a.

In the present embodiment, the first function block 309 and the second function block 310 in FIG. 1 are assumed as user function blocks, while the third function block 311 is assumed as protected function block. Hereafter, occasionally, the first function block 309 and the second function block 310 may be called "user function blocks 309, 310", while the third function block 311 may be called "protected function block 311".

The extraction section 312 (constituting the editing means in the claimed invention) is connected to the control section 303 and the library 308 and extracts the function programs included in the user function blocks 309, 310 or the protected function block 311 and necessary to form the foregoing control program, from the library 308 for allocation.

The program forming section 313 (also constituting the editing means in the claimed invention) is connected to the control section 303, the display 305 and the extraction section 312 and forms a control program by linking some of the function programs extracted by the extraction section 312.

The save section 314 (corresponding to the function block save section in the claimed invention) is connected to the comparison/judgment section 304b of the control section 303 and the library 308. In forming the control program, the save section 314 makes the function program included in the user function block 309, 310 which has been altered by the user outside the library 308, replace the corresponding function program in the library 308 and saves the replaced function program.

The communication section 315 is connected to the control section 303 and transmits the formed control program to the CPU module 10 or inputs thereto information on the specifications of the I/O modules 1 and 2 by exchanging signals between itself and the CPU module 10.

In the programmable controller of the construction described above, when the user prepares a control program, which is necessary for the exchange of signals between the I/O module 1, 2 and an external device connected thereto, in dependence on the external device, the control section 303 controls the extraction section 312 based on the manipulation of the keyboard 301 or the mouse 302. The extraction section 312 extracts from the library 308 the function programs included in the function blocks 309, 310, 311 and necessary in forming a control program and sends the extracted function programs to the program forming section 313.

Based on the manipulation by the user, the extracted function blocks 309, 310, 311 are mutually linked in the program forming section 313, so that a control program including some of the function blocks 309, 310, 311 is prepared.

After being converted into the machine language in the machine language conversion section 304a, the prepared control program is transmitted from the control section 303 to the CPU module 10 through the communication section 315 and is stored in the control program storage section 103. The CPU module 10 executes the stored control program and controls the exchange of signals between the I/O module 1, 2 and the external device connected thereto.

Next, the data structures of the user function blocks 309, 310 and the protected function block 311 stored in the library 308 in the present embodiment will be described with reference to FIGS. 2(A) and 2(B). As shown in FIG. 2(A), each of the user function blocks 309, 310 (FIG. 2(A) typically shows the user function block 309 only) is composed of a header 309a, a data body 309b, and a footer 309c.

The header 309a has various identifiers stored therein. Further, the data body 309b is data composing a function program included in the user function block 309 and is program data for forming a ladder logic being a control program for the I/O module 2 or the like. The data body 309b is altered (edited) by the user in the program forming section 313 after being extracted from the library 308.

Further, the footer 309c stores therein a step number 309d of the function program in the data body 309b and a value 309e calculated in an error detection according to the data body 309b. In each of the user function blocks 309, 310, in order to make the distinction from the protected function block 311 possible, a value 0 is set as each of the step number 309d and the value 309e calculated by the error detection. The step number 309d of the function program and the value 309e calculated by the error detection have been set to be inalterable.

Figure 2B:
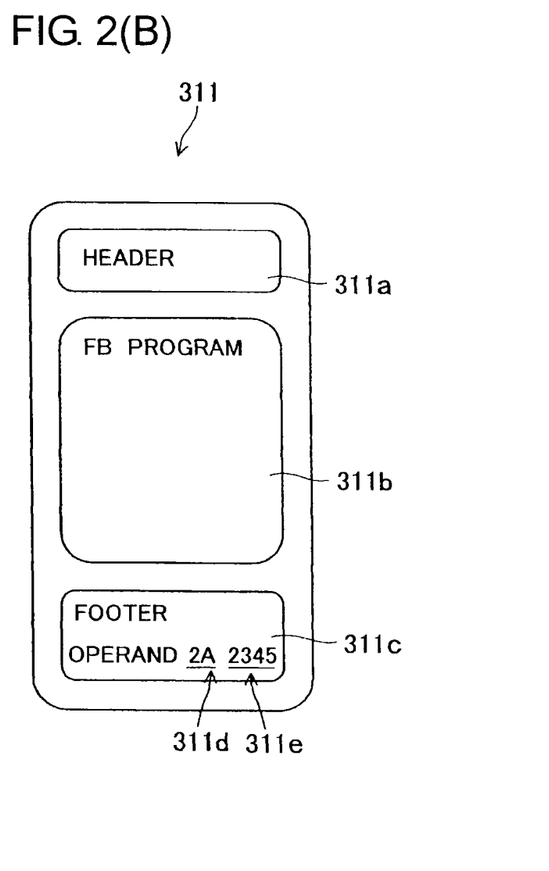
Figure 3:
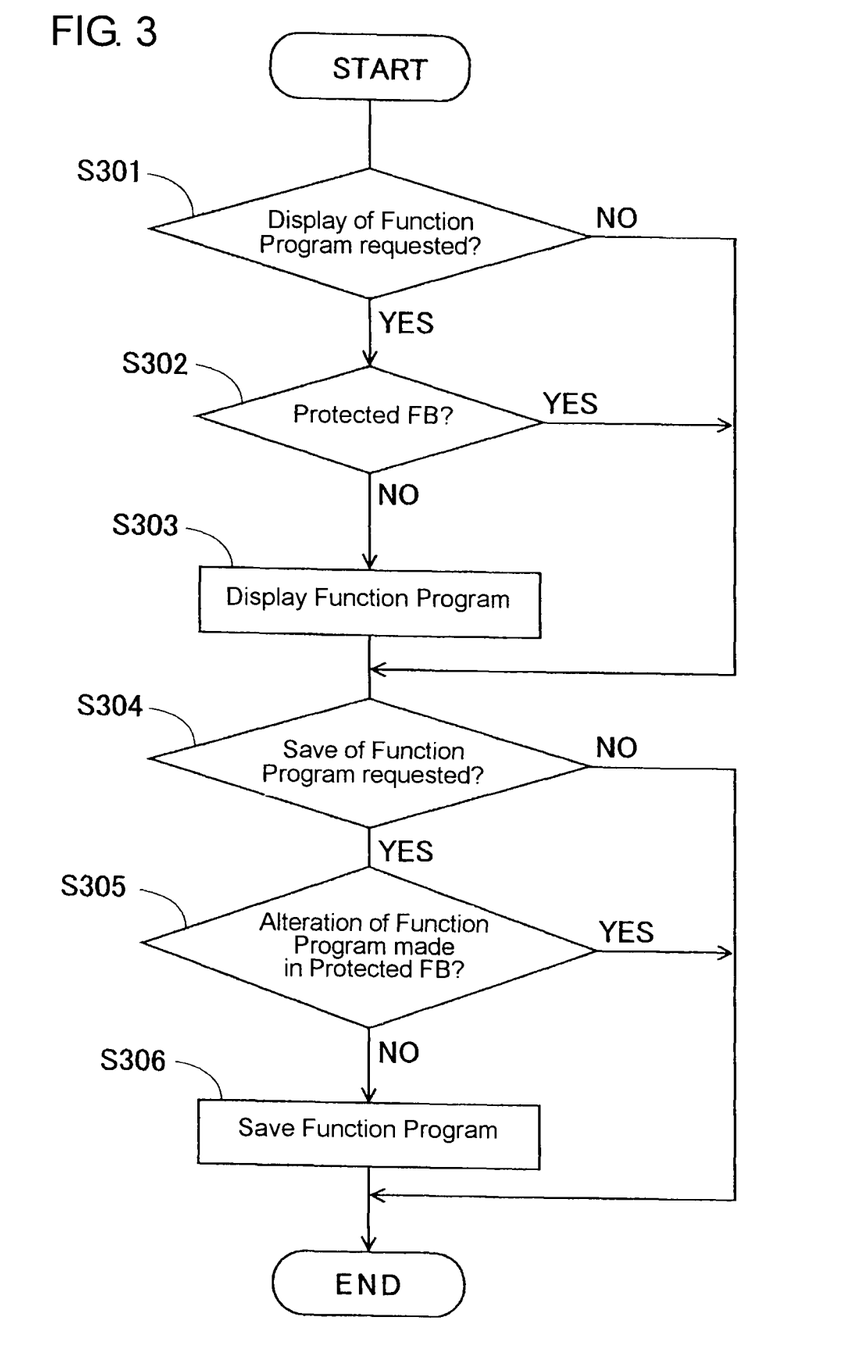
FIG. 3 is a flow chart showing a program editing method practiced by the terminal device shown in FIG. 1.

On the other hand, as shown in FIG. 2(B), the protected function block 311 is also composed of a header 311a storing various identifiers therein, a data body 311b composing a function program included in the protected function block 311, and a footer 311c.

Like those in the user function blocks 309, 310, the data body 311b is program data for forming a ladder logic being a control program for the I/O module 1 or the like.

Further, the footer 311c stores therein a step number 311d being a result which is calculated based on the function program in the data body 311b, and a value 311e calculated by an error detection according to the data body 311b. The value 311e is a value which has been calculated by an error detection using a so-called "checksum" or "CRC (cyclic redundancy checksum)" or another method. The step number 311d of the function program and the value 311e calculated by the error detection have been set to be inalterable.

Next, an editing method of a control program by the terminal device 30 in the present embodiment will be described with reference to FIG. 3. Hereafter, a control method in which the control section 303 operates in accordance with the function program included in the function block 309, 311 will be described in each of the case where a display request to the display 305 is made and the case where a save request is made to save the function block 309, 311 in the library 308.

First of all, when the user manipulates the keyboard 301 or the mouse 302 to request that the function program included in a designated one of the function blocks 309, 311 be displayed on the display 305 (step S301), a judgment is made of whether the function block including the function program for which the display request is made is the protected function block 311 or not (step S302).

The comparison/judgment section 304b judges whether the designated function block is the user function block 309 or the protected function block 311, based on the step number 309d, 311d of the function program and the value 309e, 311e calculated by the error detection which number and value are stored in the footer 309c, 311c of the function block 309, 311.

That is, if the step number 309d, 311d of the function program and the value 309e, 311e calculated by the error detection are both 0 (zero), the designated function block is judged to be the user function block 309. On the contrary, if the step number 309d, 311d of the function program and the value 309e, 311e calculated by the error detection are both not 0 (zero), the designated function block is judged to be the protected function block 311.

If the function block including the function program for which the display request is made is the user function block 309, the control section 303 allows the function program to be displayed on the display 305 (step S303). On the other hand, if the function block including the function program for which the display request is made is the protected function block 311, the control section 303 inhibits the function program from being displayed on the display 305 (step S302).

In either of the cases that the display request for the function program is not made (step S301), that the function program is inhibited from being displayed on the display 305 (step S302) and that the function program is displayed on the display 305 (step S303), the user then manipulates the keyboard 301 or the mouse 302, so that a judgment is made of whether there is made a request for making the function program having been altered (edited) in the program forming section 313, replace (to be saved in place of) the corresponding function program in the library 308 (step S304).

If it is judged that a request is made to save the function program in the library 308, it is further judged whether or not the function block including the function program for which the save request is made is the protected function block 311 and whether or not the function program for which the save request is made has been altered (step S305).

In the same manner as described above, the comparison/judgment section 304b judges whether the function block including the designated function program is the user function block 309 or the protected function block 311, based on the step number 309d, 311d of the function program and the value 309e, 311e calculated by the error detection which number and value are stored in the footer 309c, 311c of the function block 309, 311. Further, based on the step number 311d of the function program and the value 311e calculated by the error detection which number and value are stored in the protected function block 311, it is also judged whether the designated function program has been altered or not.

That is, if the step number 309d, 311d of the function program and the value 309e, 311e calculated by the error detection are both 0 (zero), the designated function block is judged to be the user function block 309. On the contrary, if the step number 309d, 311d of the function program and the value 309e, 311e calculated by the error detection are both not 0 (zero), the designated function block is judged to be the protected function block 311.

Further, the step number of the function program in the protected function block 311 for which the save request is made, and the calculation value by the error detection are again calculated and are compared with the step number 311d and the value 311e calculated by the error detection stored in the footer 311c. If the step number and the value calculated by the error detection of the function program in the protected function block 311 which number and value have been calculated again respectively coincide with the step number 311d and the value 311e calculated by the error detection of the function program which number and value are stored in the footer 311c, it is judged that no alteration has been made with the function program in the protected function block 311 for which the save request is made.

On the other hand, if either of the step number and the value calculated by the error detection of the function program in the protected function block 311 which number and value have been calculated again does not coincide with a corresponding one of the step number 311d and the value 311e calculated by the error detection of the function program stored in the footer 311c, it is judged that alteration has been made with the function program in the protected function block 311 for which the save request is made.

If the function block including the function program for which the save request is made is not the protected function block 311 or if the function program for which the save request is made has not been altered, the control section 303 allows the function program for which the save request is made, to be saved in the library 308 (step S306). On the contrary, if the function block including the function program for which the save request is made is the protected function block 311 and if the function program for which the save request is made has been altered, the control section 303 inhibits the function program for which the save request is made, from being saved in the library 308 (step S305).

The control flow is terminated in either of the cases where the save request for the function program is not made (step S304), where the function program for which the save request is made is inhibited from being saved in the library 308 (step S305) and where the function program for which the save request is made is saved in the library (step S306).

A modification may be made not to judge whether the function program for which the save request is made has been altered or not in the foregoing step S305. In this modification, the function program for which the save request is made may be allowed to be saved in the library 308 if the function block including the function program for which the save request is made is not the protected function block 311, and the function program for which the save request is made may be inhibited from being saved in the library 308 if the function block including the function program for which the save request is made is the protected function block 311.

In the present embodiment, the terminal device 30 allows the function program included in the user function block 309, 310 in the library 308 to be altered and inhibits the function program included in the protected function block 311 from being altered.

Accordingly, it becomes possible to store in the same or common library 308 the protected function block 311 which is to be inhibited from being altered by the user and the user function blocks 309, 310 which are allowed to be altered by the use. Thus, the degree of freedom in preparing control programs can be enhanced because the function blocks 309, 310, 311 of both kinds can be used in preparing control programs. Further, since no other library but the library 308 is needed, the terminal device 30 can be reduced in cost by preventing the memory capacity from increasing.

Further, as a result that alteration is inhibited of the function program included in the protected function block 311 in the library 308, alteration can also be inhibited of the function program inherent to the I/O module 1 having external safety devices 1a connected thereto. Thus, it can be realized to make the I/O module 1 having the external safety devices 1a connected thereto operate normally at all times, so that the programmable controller can be made to be enhanced in safety.

Further, the protected function block 311 is one which has been ready-made, while the user function blocks 309, 310 are those prepared by the user.

Accordingly, it can be realized to protect the function program included in the ready-made protected function block 311 which has been prepared in advance by the manufacturer of the programmable controller and to enable the user to alter the function programs included in the user function blocks in preparing control programs.

Further, the control section 303 of the terminal device 30 inhibits the function program included in the protected function block 311 from being displayed by the display 305.

Accordingly, the function program included in the protected function block 311 is made for the user to be unable to see or observe, so that the function program can be prevented from being altered.

Further, the control section 303 of the terminal device 30 inhibits the function program included in the protected function block 311 and having been altered outside the library 308, from being saved by the save section 314 in the library 308 (i.e., from replacing the corresponding function program in the library 308).

Accordingly, even if the function program included in the protected function block 311 is altered outside the library 308 as is done in the program forming section 313, it does not take place that alteration is made with the corresponding function program in the library 308.

Further, the control section 303 of the terminal device 30 inhibits the function program included in the protected function block 311 from being displayed by the display 305 and also inhibits the altered function program included in the protected function block 311 from being saved by the save section 314 in the library 308.

Accordingly, the alteration of the function program included in the protected function block 311 can be inhibited in the two methods, so that the reliability in protection of the function program included in the protected function block 311 can be further enhanced.

Further, the protected function block 311 appends thereto the step number 311d and the value 311e calculated by the error detection of the function program included therein, and the control section 303 of the terminal device 30 discriminates the protected function block 311 from the user function blocks 309, 310 based on these appended values.

Accordingly, without implementing any particular method, it becomes possible to easily discriminate the protected function block 311 from the user function blocks 309, 310, so that the alteration of the function program can be inhibited.

Further, the control section 303 of the terminal device 30 judges whether the function program included in the protected function block 311 has been altered or not, based on the step number 311d and the value 311e calculated by the error detection of the included function program.

Accordingly, whether the included function program has been altered or not is easily judged without implementing any particular method, so that the altered function program included in the protected function block 311 can be inhibited from replacing the corresponding function program in the library 308.

As described above, in the present embodiment, whether a designated function block is the protected function block 311 or not is judged based on both of the step number 309d, 311d and the value 309e, 311e calculated by the error detection of the function program included in the designated function block, and a judgment is made of whether the function program for which a save request is made has been altered or not, so that more accurate judgments can be made.

Second Embodiment

Figure 4:
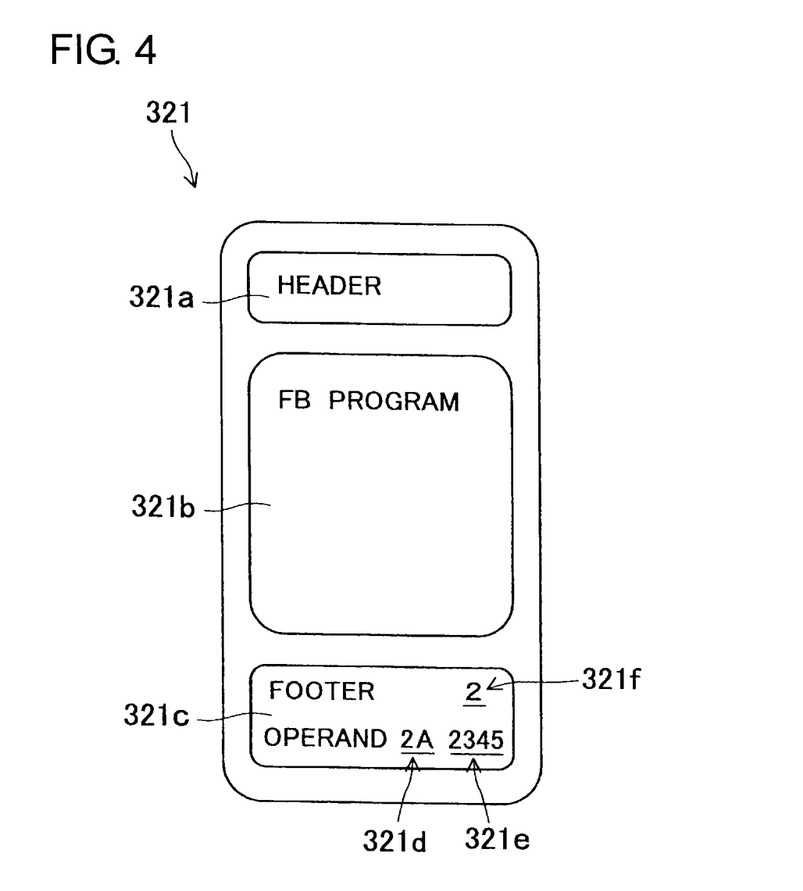
FIG. 4 is an explanatory view showing the program structure of a protected function block in a second embodiment according to the present invention.
Figure 5:
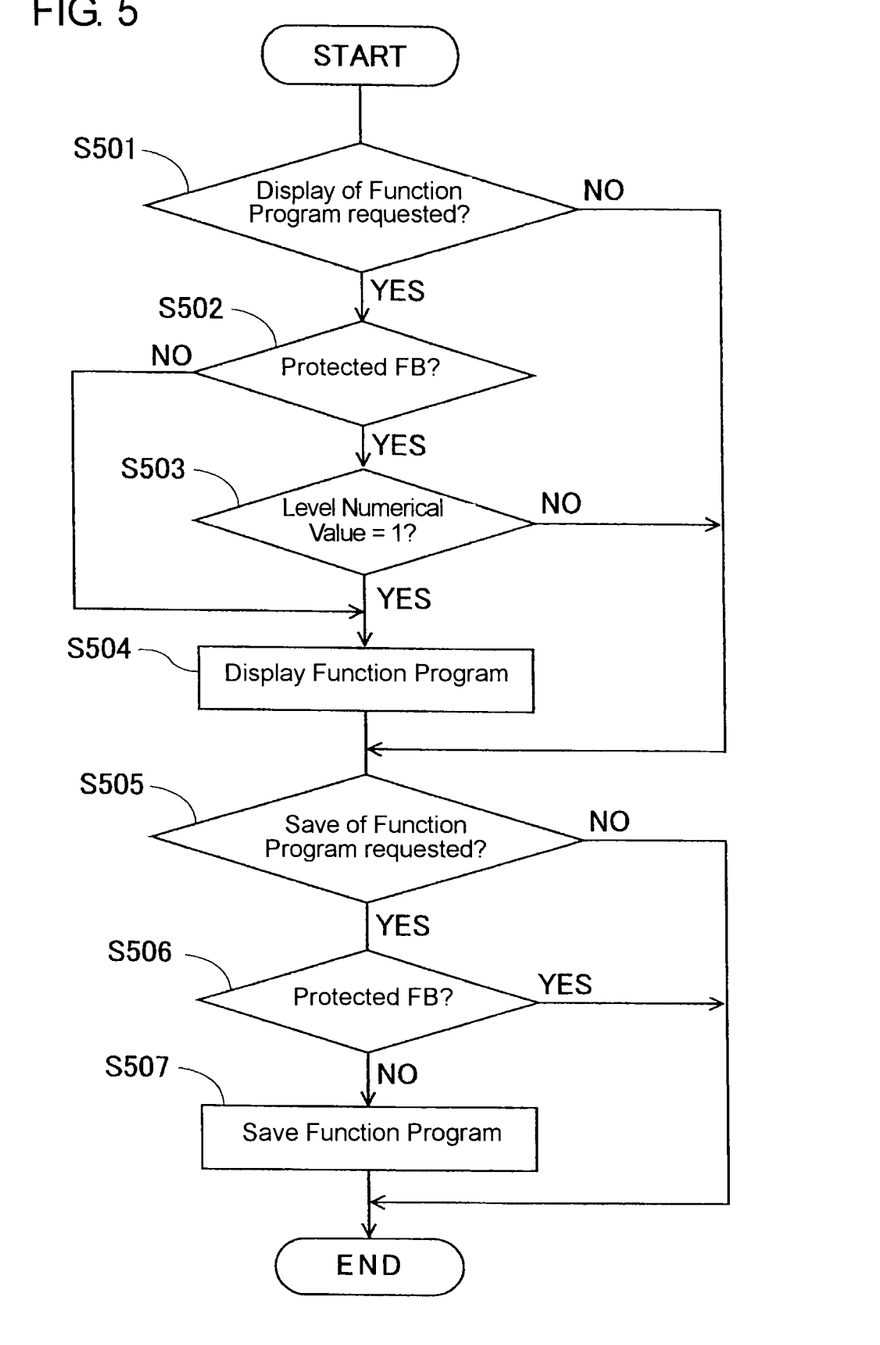
FIG. 5 is a flow chart showing a program editing method practiced by the terminal device in the second embodiment.

Hereafter, a program editing device for a programmable controller in a second embodiment according to the present invention will be described with reference to FIGS. 1, 4 and 5. In FIG. 5, a protected function block is shown as "Protected FB". As shown in FIG. 4, like the protected function block 311 in the first embodiment, a protected function block 321 in the second embodiment is composed of a header 321a storing various identifiers therein, a data body 321b composing a function program included in the protected function block 321, and a footer 321c.

Similar to that in the protected function block 311, the data body 321b is program data for forming a ladder logic being a control program for the I/O module 1 or the like having the external safety devices 1a connected thereto.

Further, the footer 321c stores therein a step number 321d being a result which has been calculated based on a function program in the data body 321b, and a value 321e calculated in an error detection according to the data body 321b. The value 321e is a value which has been calculated by an error detection using a so-called "checksum" or "CRC (cyclic redundancy checksum)" or another method.

In this second embodiment, the footer 321c of the protected function block 321 further stores therein a level value 321f (corresponding to the weighting numerical value in the claimed invention). The level numerical value 321f indicates a protection level for use in inhibiting the alteration of the function program included in the protection function block 321. In the second embodiment, the level numerical value 321f is stored as "1" or "2" though the present invention is not limited to such a numerical value. It is meant that the numerical value "2" is higher in protection level than the numerical value "1". The aforementioned step number 321d, the value 321e calculated by the error detection and the level numerical value 321f of the function program have been set to be inalterable.

Other constructions are same as those in the foregoing first embodiment, and description will be omitted regarding such other constructions.

Next, a control method of the programmable controller in the second embodiment will be described with reference to FIG. 5. Hereafter, a control method in which the control section 303 operates in accordance with the function program included in the function block 309, 321 will be described in each of the case where a display request to the display 305 is made and the case where a save request is made to save the function block 309, 311 in the library 308.

First of all, when the user manipulates the keyboard 301 or the mouse 302 to request that the function program included in a designated one of the function blocks 309, 321 be displayed on the display 305 (step S501), a judgment is made of whether the function block including the function program for which the display request is made is the protected function block 321 or not (step S502).

In the same manner as in the foregoing first embodiment, the comparison/judgment section 304b judges whether the designated function block is the user function block 309 or the protected function block 321, based on the step number 309d, 321d and the value 309e, 321e calculated by the error detection of the function program stored in the footer 309c, 321c of the function block 309, 321.

If the function block including the function program for which the display request is made is the user function program 309, the control section 303 allows the display of the function program on the display 305 (step S504).

On the contrary, if the function block including the function program for which the display request is made is the protected function program 321, a judgment is made of whether the level numerical value 321f stored in the footer 321c is "1" or not (step S503).

If the level numerical value 321f is "1", the control section 303 judges that the function program for which the display request is made is small in the significance of protection, and allows the display of the function program on the display 305 (step S504). If the level numerical value 321f is "2", on the contrary, the control section 303 judges that the function program for which the display request is made is large in the significance of protection, and inhibits the display of the function program on the display 305 (step S503).

In either of the cases where no display request is made for the function program (step S501), where the display of the function program on the display 305 is inhibited (step S503) and where the function program is displayed on the display 305 (step S504), the user then manipulates the keyboard 301 or the mouse 302, so that a judgment is made of whether a request has been made for making the function program having been altered (edited) in the program forming section 313, replace (to be saved in place of) the corresponding function program in the library 308 (step S505).

When it is judged that there is a request for the save of the function program in the library 308, it is further judged whether the function block including the function program for which the save request is made is the protected function block 321 or not (step S506). In a similar manner to the foregoing case, the comparison/judgment section 304b judges whether the function block including the designated function program is the user function block 309 or the protected function block 321.

If the function block including the function program for which the save request is made is not the protected function block 321, the control section 303 allows the function program for which the save request is made, to be saved in the library 308 (step S507). If the function block including the function program for which the save request is made is the protected function block 321, on the contrary, the control section 303 inhibits the function program for which the save request is made, from being saved in the library 308 (step S506).

The control flow is terminated in either of the cases where the save request for the function program is not made (step S505), where the function program for which the save request is made is inhibited from being saved in the library 308 (step S506) and where the function program for which the save request is made is saved in the library (step S507).

According to the present second embodiment, the level numerical value 321f being a weighing numerical value is appended to the protected function block 321, and when it is judged based on the level numerical value 321f that the protected function block 321 is large in the significance of protection, the control section 303 inhibits the function program included in the protected function block 321 from being displayed on the display 305 and also inhibits the function program in the altered protected function block 321 from being saved by the save section 314 in the library 308. Further, if it is judged based on the level numerical value 321f that the protected function block 321 is small in the significance of protection, the control section 303 allows the function program included in the protected function block 321 to be displayed, but inhibits the function program included in the altered protected function block 321 from being saved by the save section 314 in the library 308.

Accordingly, because there can be practiced a method of inhibiting the alteration of the function program included in the protected function block 321 in dependence on the significance in protection of the protected function block 321, the protection of the protected function block 321 can be enhanced in reliability, and it becomes possible to save the time taken to protect the protected function block 321 and to save the memory capacity or the like in the terminal device 30.

Further, when the function program included in the protected function block 321 is judged to be small in the significance of protection, the function program included in the protected function block 321 is displayed by the display 305, and this enables the user to see or observe the function program, so that the preparation work for control programs can be enhanced in efficiency.

Other Embodiments

The present invention is not limited to the foregoing embodiments and may be modified or developed as follows:

There may be provided a plurality of libraries 308 each of which stores the user function blocks 309, 310 in mixture together with the protected function block 311.

The library 308 may not be provided in the terminal device 30, but may be provided in the CPU module 10. Alternatively, the library 308 may be provided in each of the terminal device 30 and the CPU module 10.

The footer 309c, 311c of the function block 309, 311 does not necessarily store therein both of the step number 309d, 311d and the value 309e, 311e calculated by the error detection, but may stores therein either of them.

The footer 309c, 311c of the function block 309, 311 may be made to store a calculation result other than the step number 309d, 311d and the value 309e, 311e calculated by the error detection.

In place of, or in addition to, the foregoing method of preventing the alteration of the function program included in the protected function block 311, a modification may be made so that the control section 303 rejects a command itself which is instructed by the user to alter the function program included in the protected function block 311.

The control section 303 including the comparison/judgment section 304b, the extraction section 312, the program forming section 313 and the save section 314 may be provided in the CPU module 10. In this modified form, the terminal device 30 and the CPU module 10 collectively correspond to the program editing device in the claimed invention.

In the foregoing embodiments, the protected function block 311 is made to be inherent to the safety I/O module 1, while the unprotected function blocks 309, 310 are made to be inherent to the ordinary-use I/O module 2. However, the protected function block 311 may be made to be inherent to some of a plurality of safety I/O modules, while the unprotected function blocks 309, 310 may be made to be inherent to the remaining safety I/O modules. Moreover, the protected function block 311 may be made to be inherent to some of a plurality of ordinary-use I/O modules, while the unprotected function blocks 309, 310 may be made to be inherent to the remaining ordinary-use I/O modules.

Further, in the foregoing embodiment, one that has been prepared in advance by the manufacturer is used as the protected function block, while one that is prepared by the user is used as the unprotected function block. However, one that has been prepared in advance may be used as the unprotected function block, while one that is prepared by the user may be used as the protected function block in order to be prevented from being altered by other users.

The foregoing first embodiment is configured to inhibit the display of the function programs included in all of the protected function blocks, while the foregoing second embodiment is configured to inhibit the display of the function programs included in the protected function blocks in dependence on the significance of protection. However, it may be further modified to allow the display of the function programs included in all of the protected function blocks but to inhibit the alteration thereof.

Various features and many of the attendant advantages in the foregoing embodiments will be summarized as follows:

In the editing device in the first embodiment shown in FIGS. 1-3, because the editing means 303, 312, 313 allows the alteration of the function program included in the unprotected function block 309, 310 in the library 308 but inhibits the alteration of the function program included in the protected function block 311, it becomes possible to store in the common library 308 the protected function block 311 inhibited from alteration by the user and the unprotected function block 309, 310 allowed to be altered by the user. Thus, it becomes possible to use the function blocks of the both kinds in preparing control programs, so that a degree of freedom can be enhanced in preparing control programs. Further, since no other library but one library 308 only is required, an increase in memory capacity can be prevented, so that the program editing device 30 for the programmable controller can be reduced in cost.

In the editing device in the first embodiment shown in FIGS. 1-3, since the alteration of the function program inherent to the safety I/O module 1 is inhibited, it becomes possible to make the safety I/O module 1 having the external safety devices 1a connected thereto operate normally at all times, so that the programmable controller can be enhanced in safeness.

In the editing device in the first embodiment shown in FIGS. 1-3, it becomes possible to protect the function program included in the ready-made protected function block 311, and it also becomes possible for the user to alter the function program included in the unprotected function block 309, 310 in preparing control programs.

In the editing device in the first embodiment shown in FIGS. 1-3, since the editing means 303, 312, 313 rejects a command for the alteration of the function program included in the inputted protected function block 311, it becomes possible very easily to inhibit the alteration of the function program included in the protected function block 311.

In the editing device in the first embodiment shown in FIGS. 1-3, since the editing means 303, 312, 313 inhibits the program display section 305 from displaying the function program included in the protected function block 311, the user is prevented from seeing or observing the function program, so that the function program included in the protected function block 311 can be prevented from being altered.

In the editing device in the first embodiment shown in FIGS. 1-3, since the editing means 303, 312, 313 inhibits the function program included in the protected function block 311 which has been altered outside the library 308, from replacing the corresponding function program 311 in the library 308, it does not take place that the corresponding function program 311 in the library 308 is altered even when the function program included in the protected function block 311 has been altered outside the library 308. Further, since the editing means 303, 312, 313 inhibits the display of the function program included in the protected function block 311 and also inhibits the function program included in the protected function block 311 which has been altered outside the library 308, from replacing the corresponding function program in the library 308, the alteration of the function program included in the protected function block 311 can be inhibited from being altered in the two methods, so that the protection of the function program included in the protected function block 311 can be further enhanced in reliability.

In the editing device in the first embodiment shown in FIGS. 1-3, since the editing means 303, 312, 313 discriminates the protected function block 311 from the unprotected function block 309, 310 based on the appended inalterable calculation result according to the function program in the protected function block 311, it becomes possible to easily discriminate the protected function block 311 from the unprotected function block 309, 310 without implementing any particular method, and hence, it becomes possible to inhibit the function program included in the protected function block 311 from being altered in the library 308.

In the editing device in the first embodiment shown in FIGS. 1-3, since based on the appended inalterable calculation result according to the function program in the protected function block 311, the editing means 303, 312, 313 judges whether the function program included in the protected function block 311 has been altered or not, it becomes possible without implementing any particular method to easily judge whether the function program included in the protected function block 311 has been altered or not, so that the altered function program can be inhibited from replacing the corresponding function program in the library 308.

In the editing device in the first embodiment shown in FIGS. 1-3, since the protected function block 311 appends thereto the step number 311d of the function program included therein, it becomes possible to easily discriminate the protected function block 311 from the unprotected function block 309, 310 based on the appended step number 311d, so that whether the function program has been altered or not can easily be judged by the comparison of an actually included step number of the function program with the appended step number 311d.

In the editing device in the first embodiment shown in FIGS. 1-3, since the protected function block 311 appends thereto the value 311e calculated by the error detection according to the function program included therein, it becomes possible to easily discriminate the protected function block 311 from the unprotected function block 309, 310 based on the appended value 311e detected by the error detection, so that whether the function program has been altered or not can easily be judged by the comparison of an actually included value detected by the error detection of the function program with the appended value 311e.

In the editing device in the second embodiment shown in FIGS. 1, 4 and 5, since the weighting numerical value 321f is appended to the protected function block 321, it becomes possible to implement a method of inhibiting the alteration of the function program in dependence on the significance in protection of the function program included in the protected function block 321. Therefore, the protection of the function program included in the protected function block 321 can be enhanced in reliability, and it becomes possible to save the time taken to protect the function program included in the protected function block 321 and to save the memory capacity or the like in the editing device 30. Further, when it is judged that the function program included in the protected function block 321 is small in the significance of protection, the user is enabled to see or observe the function program being displayed by the program display section 305, so that the work for preparing control programs can be enhanced in efficiency.

Obviously, further numerous modifications and variations of the present invention are possible in light of the above teachings. It is therefore to be understood that within the scope of the appended claims, the present invention may be practiced otherwise than as specifically described herein.

What is claimed is:

1. A program editing device for editing control programs which are executable in a programmable controller, the program editing device comprising:
    a library storing protected function blocks and unprotected function blocks therein; and
    editing means for forming a control program by linking some of function programs included in the protected function blocks or the unprotected function blocks in the library, for allowing the alteration of the function programs included in the unprotected function blocks in the library, and for inhibiting the alteration of the function programs included in the protected function blocks in the library,
    wherein:
    each of the protected function blocks appends thereto an inalterable calculation result according to the function program included therein; and
    the editing means discriminates the protected function blocks from the unprotected function blocks based on the appended calculation result.

2. The program editing device as set forth in claim 1, wherein:
    the programmable controller comprises a safety I/O module having external safety devices connected thereto and an ordinary-use I/O module having external devices other than the external safety devices connected thereto;
    the function programs included in the protected function blocks are inherent to the safety I/O module; and
    the function programs included in the unprotected function blocks are related to the ordinary-use I/O module.

3. The program editing device as set forth in claim 1, wherein:
    the protected function blocks are function blocks which have already been prepared; and
    the unprotected function blocks are function blocks which are able to be prepared by the user.

4. The program editing device as set forth in claim 1, wherein the editing means rejects a command for the alteration of the function program included in a protected function block having been inputted.

5. The program editing device as set forth in claim 1, further comprising a program display section for displaying a formed control program on the basis of the protected function block or the unprotected function block; and
   wherein the editing means inhibits the display by the program display section of the function programs included in the protected function blocks.

6. The program editing device as set forth in claim 1,
   wherein the editing means is provided with a function block save section for making a function program having been altered outside the library replace the corresponding function program in the library, and
   wherein the editing means inhibits the function block save section from making the function program included in the protected function block having been altered outside the library replace the corresponding function program in the library.

7. The program editing device as set forth in claim 6, wherein:
   each of the protected function blocks appends thereto an inalterable calculation result according to the function programs included therein; and
   the editing means judges based on the appended calculation result whether the function program included in each protected function block has been altered or not.

8. The program editing device as set forth in claim 1, wherein each of the protected function blocks appends thereto a step numbers of the function program included therein.

9. The program editing device as set forth in claim 1, wherein each of the protected function blocks appends thereto a value calculated by an error detection according to the function program included therein.

10. The program editing device as set forth in claim 1, further comprising a program display section for displaying a formed control program on the basis of the protected function block or the unprotected function block; and wherein:
   the protected function block appends thereto a weighting numerical value; and
   the editing means includes a function block save section which makes the function program having been altered outside the library replace the corresponding function program in the library;
   when it is judged based on the weighting numerical value that the function program included in the protected function block is large in significance of protection, the editing means inhibits the program display section from displaying the function program included in the protected function block and also inhibits the function block save section from making the function program included in the altered protected function block replace the corresponding function program in the library; and
   when it is judged based on the weighting numerical value that the function program included in the protected function block is small in significance of protection, the editing means allows the display by the program display section of the function program included in the altered protected function block, but inhibits the function block save section from making the function program included in the altered protected function block replace the corresponding function program in the library.

* * * * *